Oct. 1, 1968  P. E. SOLT  3,403,941
PNEUMATIC CONVEYING SYSTEM
Filed Jan. 23, 1967  3 Sheets-Sheet 1

INVENTOR
PAUL E. SOLT,

BY *Pennie Edmonds Morton Taylor & Adams*
ATTORNEYS

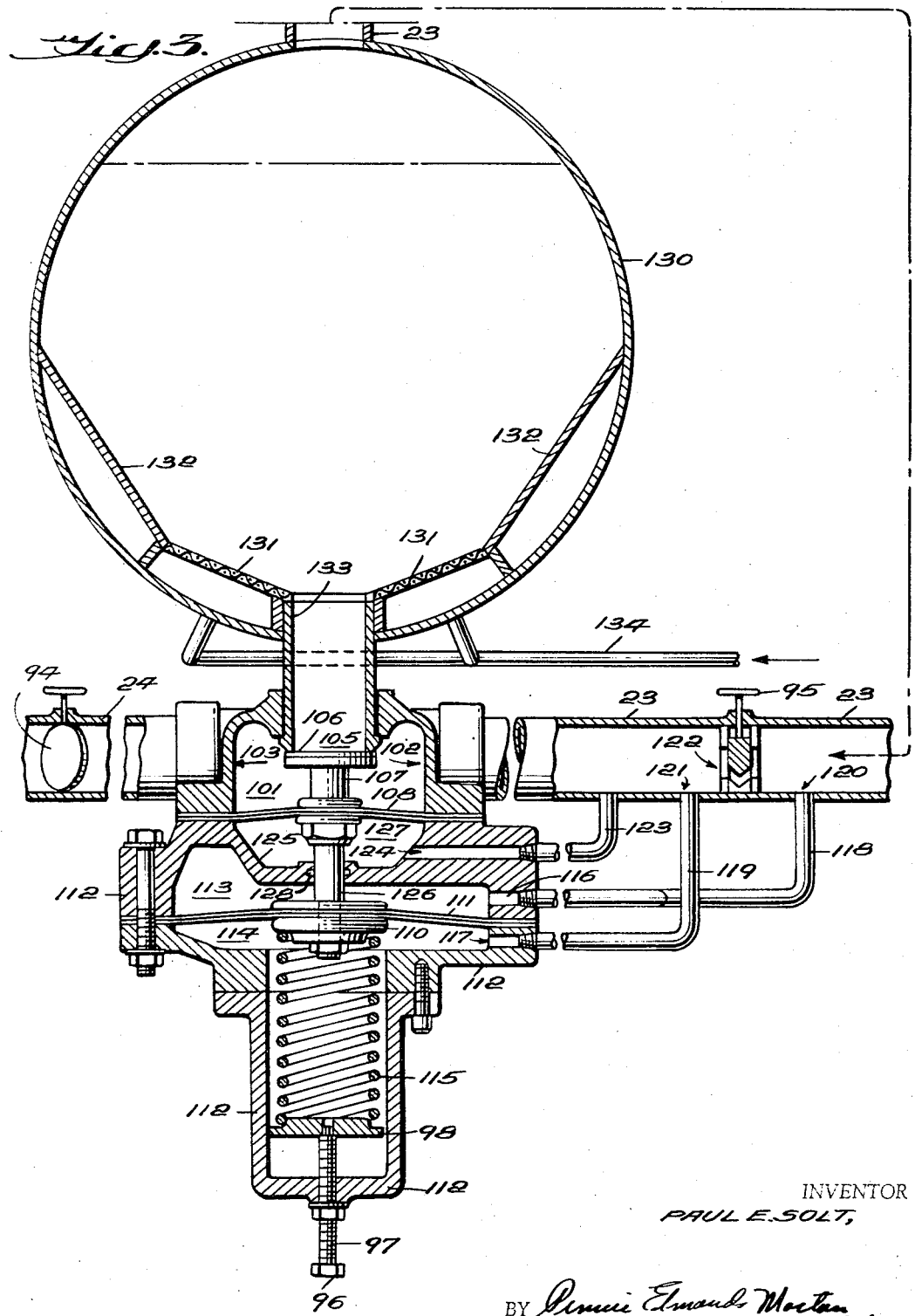

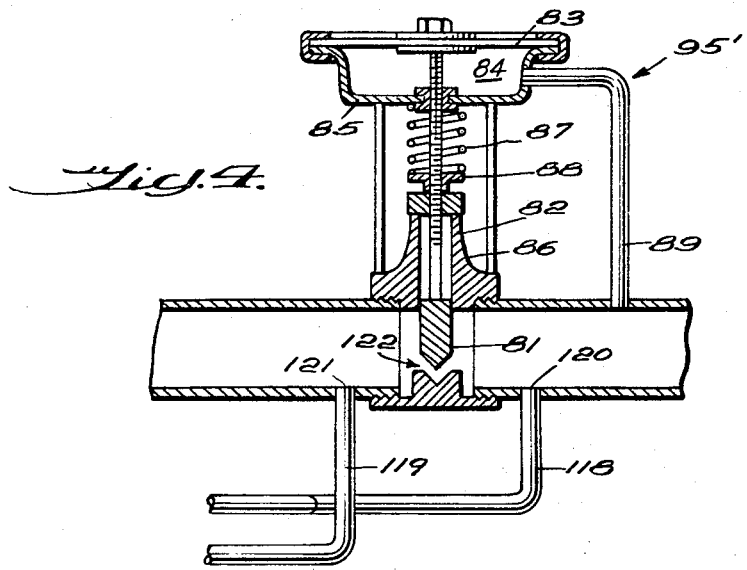
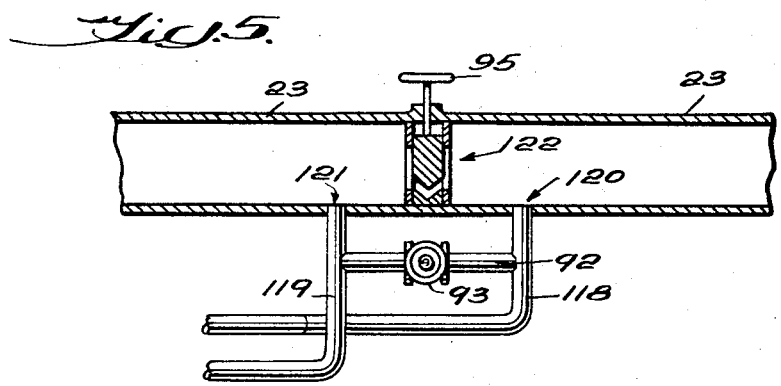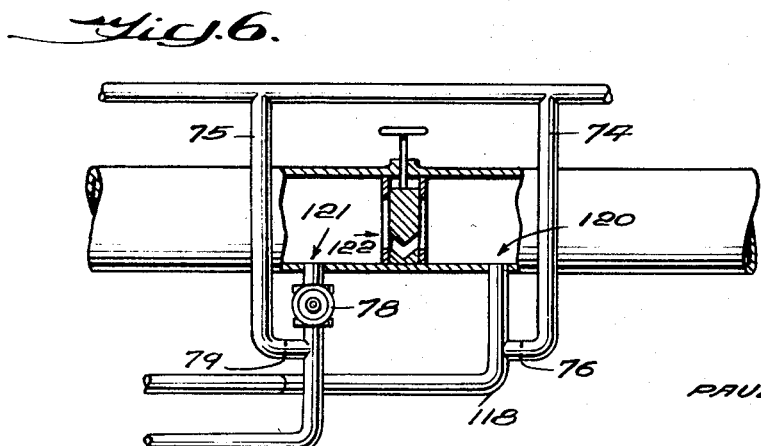

United States Patent Office 3,403,941
Patented Oct. 1, 1968

3,403,941
PNEUMATIC CONVEYING SYSTEM
Paul E. Solt, Allentown, Pa., assignor to Fuller Company, a corporation of Delaware
Filed Jan. 23, 1967, Ser. No. 611,442
27 Claims. (Cl. 302—42)

ABSTRACT OF THE DISCLOSURE

A pneumatic conveying system having a modulating control mechanism for instantaneously regulating the introduction of material into the system in response to variations in the kinetic conditions within the system.

Background of the invention

A single, basic, pneumatic-conveying unit often is required to accommodate varying conditions of material supply, or to serve a plurality of installations or significantly different conveying line lengths at the same installation, all of which vary the kinetic conditions within the system.

Another variable which is encountered in pneumatic self-unloading vehicles and which also varies the kinetic conditions within the system is that of great variations in the amount and pressure of the air supplies available at different installations.

For example, a pressure-unloading railway car may deliver its loading of cement to a highway trailer or a succession of trailers parked immediately alongside the car. This might involve 20 feet of three-inch, flexible hose as the conveying line, with as little as eight feet of lift and with use of the trailer's air supply. Blowers mounted on such trailers usually deliver, for example, about 400 c.f.m. at a pressure of up to 15–22 p.s.i.g. However, the next loading of the railway car may go to a different destination, such as a so-called cement terminal. Here, this same car may be presented with a total of, for example, 500 feet of six or eight inch conveying line, an elevation of 100 feet or more, several bends in the conveying line (which increase flow resistance) and any sort of air supply ranging from a small blower up to 100 p.s.i.g. plant air available in extreme quantities.

Under such circumstances, it has been impossible to preset the material discharge mechanism of such cars and considerable manual regulation and frequent readjustment of the discharge mechanism has been necessary to accommodate the variables.

Any given pneumatic conveying system has an optimum air/material ratio and conveying-line pressure which is peculiar to its conveying line characteristics, such as line length, diameter, elevation, number of bends, and other items such as valves.

However, since the plugging or blocking point is just beyond this optimum, it has been necessary to design systems to work short of the optimums, in order to have a safety factor against blockage or plugging of the line. This is primarily because of the fact that fixed systems have used uniform feed equipment such as screws or rotary feeders, in an attempt to remove the uncertainty of feed variations. However, the fixed-feed causes problems when variations are encountered in air flow.

Prior systems which attempted a solution by modulation of the feed rate have not achieved sufficient sensitivity. Consequently, they have been susceptible to the surging or "slugging" type of flow which swings back and forth near the optimum point. However, this swing again makes it necessary to design short of the optimum point.

Prior attempts at making automatic self-compensating systems or mechanisms have included pressure-sensitive switches controlling the discharge valve, as in Adams U.S. Patent No. 2,565,835; different-sensitive pistons operating needle valves, as in German Patent No. 736,-829; differential-sensitive diaphragms operating valves or feed gates, as in Oetiker U.S. Patent No. 2,826,459, Brooks U.S. Patent No. 2,907,605; Hill U.S. Patent No. 2,623,793, or McDonald U.S. Patent No. 3,120,979; and differential-responsive circuits on metering risers with control of the material-extruding pressure, as in Kruse U.S. Patent No. 2,916,441. These prior attempts have not been entirely satisfactory and have not been able to compensate for, or accommodate problem conditions.

Summary of the invention

The present invention not only meets many deficiencies of prior equipment and systems, but also exceeds them. The present invention is intended to automatically compensate for all of the aforementioned variables by regulating the air-material mixture in the conveying line in response to variations in the kinetic conditions within the system. It provides a system capable of remote shutoff—with reliable and correspondingly remote restart—at the discharge end of the conveying line. In other words, it is possible to deliberately close a valve or nozzle at the discharge end of the conveying line—much as is done with a garden hose—and to resume conveying simply by reopening the valve or nozzle, without any plugging or blocking of the conveying line during the period of shutdown.

This unusual capability is of particular value in certain services. For example, a rock duster in a coal mine can completely control his rig from a discharge nozzle several hundred feet from the material supply source.

In general, the method of operation of the present invention comprises the steps of establishing kinetic or air-flow condition in a pneumatic conveying system, introducing material and continuously sensing variations in the kinetic conditions within the system due to variation in the air-material mixture and instantaneously and rapidly controlling the air-material mixture within a predetermined range.

In general, the preferred form of the present invention consists of a pneumatic conveying system for receiving material via a material inlet port from a suitable material feed source and comprises an air-material entrainment chamber having a material inlet port, an air inlet and an air-material outlet therein, air supply means communicating with the air inlet, control force means including a modulating valve member adjacent the material inlet port, the modulating valve member being mounted for instantaneous motion with respect to the material inlet port for automatically varying material discharged from said port, and pressure-differential means in the air supply means, said pressure-differential means creating a pressure-differential when there is air flow through the pneumatic conveying system, the magnitude of the differential instantaneously varying with increases or decreases in the velocity of air flow through the system and said pressure-differential being communicated directly to the control force means for instantaneous rapid modulation of the modulating valve member in response to changes in the air flow. Preferably, a biasing means is provided to bias the valve member closed when there is no air flow in the conveying system.

In order to satisfy the demands of the modulating valve member, the material feed source must be capable of maintaining a pressure above the air-material entrainment chamber pressure and have available an unimpeded capacity of material to supply the entrainment chamber in response to the demands of the modulating valve member. Some examples of suitable feed sources are (1) an open hopper on a vacuum conveying system, (2) an open hopper with a pressure lock feeder, and (3) a pressurized feed from a pressurized supply vessel.

In the preferred form of the present invention, the entrainment chamber, control force means, and biasing means are housed in a casing which are referred to collectively as a modulating control mechanism; it is to be unnderstood, however, that a common casing need not be used, but rather the various components may be placed directly in the conveying system.

*Brief description of the drawings*

FIG. 3 is a side elevation, partly schematic, of a pressure feed tank, either mobile or stationary, and embodying the invention;

FIG. 4 shows a modified form of the pressure-differential means;

FIG. 5 is a modification of the pressure-differential assembly of FIG. 1; and

FIG. 6 is a modification of the pressure-differential assembly of FIG. 3.

*Description of the preferred embodiments*

Figure 1:
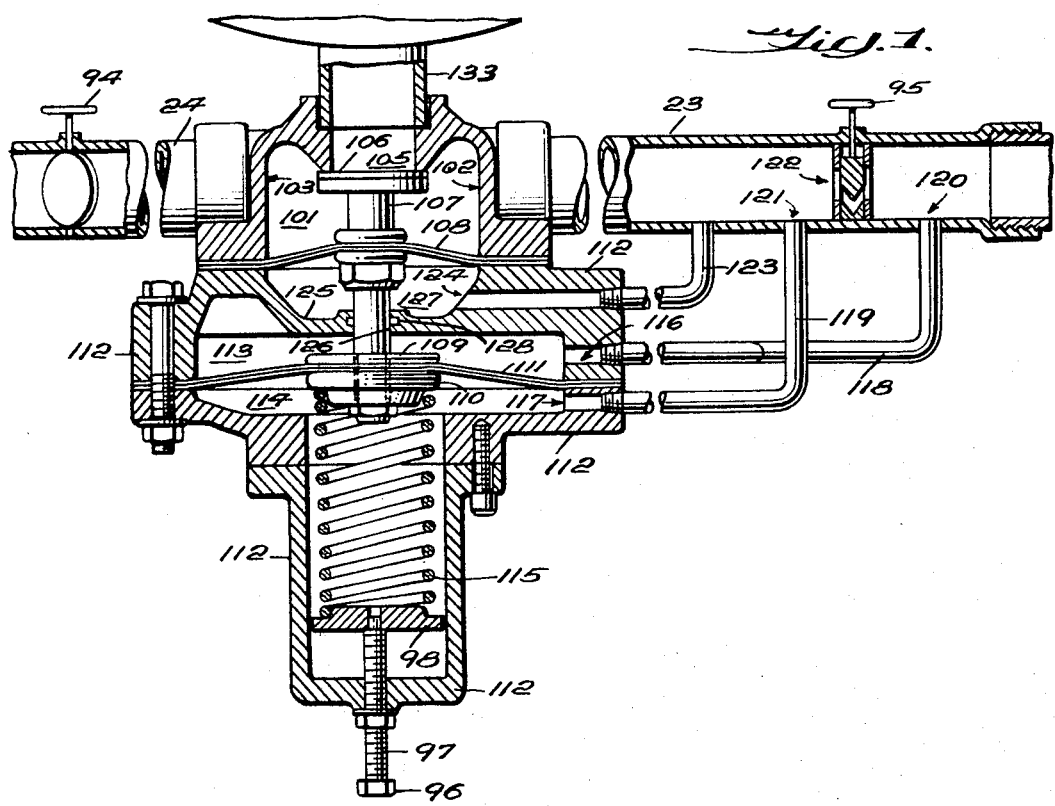
FIG. 1 is a sectional view of the modulating control mechanism connected in a pneumatic conveying system and embodying the present invention.
Figure 2:
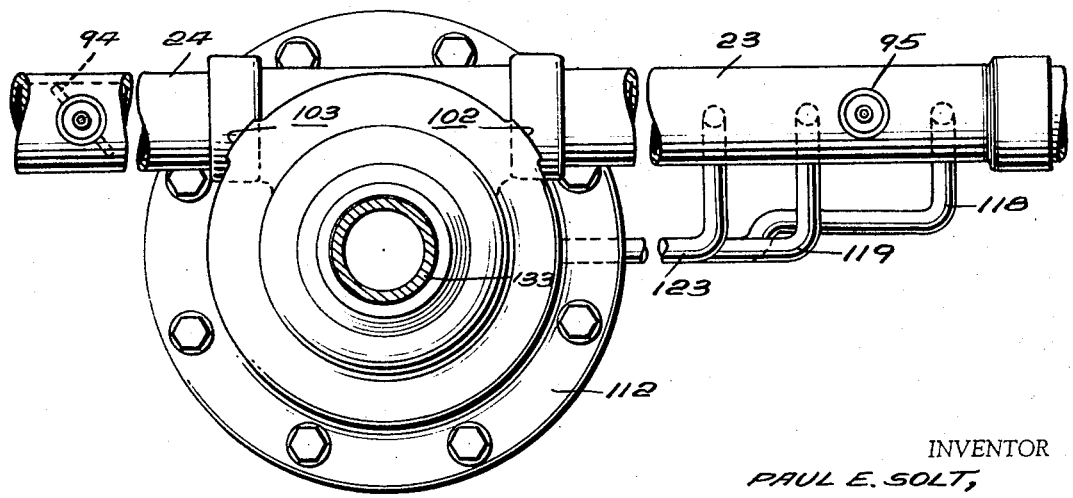
FIG. 2 is a plan view of the structure of FIG. 1.

As shown in FIGS. 1 and 2, the conveying system comprises air-supply means 23 for delivering conveying air to the system from a suitable source (not shown), a material discharge pipe 133 for delivering pulverulent material from a material feed source (not shown), air-material discharge conduit 24 for conveying a pulverulent material to its destination and a modulating control mechanism connected between the air supply means 23 and the air-material discharge conduit 24 and receiving material from the material discharge pipe 133.

The modulating control mechanism comprises a valve housing 112. The housing is divided by a rigid wall 125 into an upper and a lower compartment, the upper compartment being further divided by a flexible seal sheet 108 into an air-material entrainment chamber 101 adjacent the material inlet port 105, and a balance chamber 127 immediately adjacent the rigid wall 125.

The lower compartment of the casing 112 has a flexible diaphragm 111 spaced from the rigid wall 125 that divides the lower compartment into a closed first control chamber 113 adjacent the wall 125 and a closed second control chamber 114 positioned on the opposite side of the diaphragm 111.

The entrainment chamber 101 has a material inlet port 105 connected to the material discharge pipe 133, an air inlet port 102 connected to the air supply means 23 and an air material outlet port 103 connected to the air-material discharge conduit 24.

A modulating valve member consisting of a valve disc 106 mounted opposite the port 105 on the end of a stem 107, engages and is sealably connected to the flexible seal sheet 108. The seal sheet prevents material from passing along the stem 107 and interfering with the proper functioning of the valve. Externally of the seal 108, the stem 107 extends away from the entrainment chamber 101 and through an aperture 126 in wall 125 and into the control chamber 113. At its other end, the stem 107 is secured by disc plates 109 and 110 to the diaphragm 111. A biasing means such as coil spring 115 is aligned with the stem 107 and engages, under compression, the disc plate 110 and a wall of the casing 112. Other forms of springs or bias may be used, if desired.

The closing force of the spring 115 most advantageously is selected to at least bias the valve disc 106 closed against the material inlet port 105 when there is no air flow in the conveying system. Preferably, the closing force of the spring will have enough additional strength to continue biasing the valve disc 106 closed until a preselected minimum flow of air through the conveying system has been attained. The spring preload is established by multiplying the cross sectional area of the material inlet port 105 by the maximum material pressure presented to the inlet port, from the material feed source, plus an additional value sufficient to compensate for the pressure differential resulting from the preselected minimum flow rate of gas.

The preselected minimum flow rate of air is selected to allow some flow before any material is admitted to the entrainment chamber, thus preventing a deposit of material in the entrainment chamber at very low flow rates.

To facilitate the setting of the desired spring preload, which may vary from installation to installation, a spring preload adjusting screw 97 is threaded through the casing 112 in alignment with the spring 115. The adjusting screw has a bolt or screw head 96 at its exterior end and is rotatably secured at its other end to a spring tension adjusting plate 98. The adjusting plate 98 abuts the end of spring 115, thus permitting the spring to be compressed by turning the adjusting screw. It will be understood, however, that for many installations, the spring preload is known in advance and no provision need be made for adjustment, thus eliminating the need for said adjusting screw.

An O-ring type flexible seal 128 is mounted within aperture 126 in the rigid wall 125, and is in slidable sealing engagement with the stem 107, thus providing a seal about the shaft between the balance chamber 127 and the first control chamber 113. It is, of course, understood that the seal sheet 108 could be eliminated and a wiper seal mounted on the wall 125 in sealing engagement with the stem 107.

The casing 112 is provided with two ports 116 and 117, respectively, communicating with the otherwise closed chambers 113 and 114. Tubes 118 and 119 communicate with the ports 116 and 117, respectively. The tubes 118 and 119, respectively, communicate with ports 120 and 121 on opposite sides of a pressure-differential means 122 in the gas supply means 23.

The casing 112 also has a balance port 124 opening into the balance chamber 127 and communicating via a balancing tube 123 with the interior of the conveying conduit at a convenient point adjacent the seal 108 for balancing the pressure across the seal 108, so that it cannot act as a diaphragm. If desired, other forms of seals, such as a bellows, for example, may be substituted for the sheet seal 108.

The pressure-differential means 122 may be either a restriction in the air supply conduit 23, such as an orifice or a venturi, or a preselected length of air supply conduit. Any flow of air through the conduit will result in a pressure drop across the pressure-differential means, thus creating a pressure-differential which is communicated to the pressure diaphragh 111. The pressure-differential means, as shown, is in the form of a restriction or orifice produced by an adjustable valve 95, such as a gate valve, mounted in the air supply means 23, thus enabling the orifice to be varied in size, depending on the pressure-differential required, by adjustment of the valve. The orifice need not be of the variable type, however, but may be a fixed orifice of a preselected size.

Four separate forces are effective on the modulating control mechanism, as follows:

$Fm$—the force exerted against the valve disc 106 by the material. This is a function of the density of the material, the inherent flowability of the material, the degree of fluidization, the height of the material bed and its resultant pseudohydrostatic "head" due to gravity, and any applied force with which the material is advanced toward the material discharge pipe 133 from its source. Where the material is not fluidized, the characteristic static angle of repose of the material, as well as any applied force such as a screw feed or pneumatic pressure, will become significant in determining $Fm$;

$Fs$—the control force exerted by the spring;

$Fu$—the "upstream" pressure derived from the port 120, upstream of the orifice, which is effective against the upper surface area of the diaphragm 111;

$Fd$—the downstream pressure which is derived from the port 121 downstream of the orifice and is effective against the lower surface area of the diaphragm.

The total modulating or control force is composed of $Fs$ plus the force delivered by the diaphragm as a result of the differential between $Fu$ and $Fd$. Since the spring force $Fs$ is relatively fixed in magnitude, the modulating force or control force is dominant, if a minimum, predetemined flow of air or gas is passing the orifice 122. By selection of the strength of the spring 115, the minimum supply flow rate required to open the valve may be set. Therefore, unless and until the predetermined minimum flow rate of air is passing the orifice 122 en route through the system, the valve disc 106 is unable to move against the spring 115, since there is insufficient control-force assist by $Fu$ exceeding $Fd$ to the required extent.

Where a signficant safety factor against unintentional material discharge is desirable, such as in portable systems or vehicles, the strength of the spring 115 may be chosen to exceed the maximum potential $Fm$ by a significant amount, for example, 25% or 50%. In order to actuate the modulating control mechanism under these circumstances, it will then be necessary either to intensify the differential (reduce the orifice size) between $Fu$ and $Fd$, or preferably, simply to increase the effective area of the diaphragh 111, so that the desired balance of forces will be achieved.

Essentially, the modulating control exhibited by $Fs$ and the relationship of $Fu$ with $Fd$ is a function or reflection of the kinetic conditions within the system. This control force is applied directly to the material force $Fm$ and is, therefore, not only dominant with regard to $Fm$, but is also responsive to changes due to variations in $Fm$.

In operation of the system of FIG. 1, a stream of gas or air is supplied from a source (not shown) through the pressure-differential means 122 located in the gas supply means 23, to and through the air-material entrainment chamber 101. When the kinetic flow reaches the predetermined minimum rate, the resultant pressure drop across the pressure differential means 122 presents, via tube 118, a higher pressure in chamber 113, above the diaphragm, than the pressure presented to chamber 114 via port 121 and tube 119. Under these circumstances diaphragm 111 reacts downwardly against the spring 115 and draws the valve disc 106 away from port 105 to open a material feed area therebetween. As the rate of flow of air through the pressure-differential means increases above the minimum required for opening the material feed area, the resulting progressive increase in pressure drop between ports 120 and 121 will cause a progressive downward deflection of the diaphragm 111 to increase the feed of material.

However, the system is self-limiting, in that the introduction of material past the valve disc 106 changes the kinetics downstream of the air-material entrainment chamber and increases the flow resistance in the conveying line. Consequently, the loaded conveying line tends to oppose the free inflow of air through the pressure-differential means 122, thereby reducing the pressure-differential across the diaphragm 111 and allowing the diaphragm to move upwardy a corresponding distance. As a result, the modulating control mechanism seeks a balanced ratio between the air flow of the system and the rate of material supply.

In achieving this balance, the modulating control mechanism instantaneously modulates the rate of material introduction to maintain a stable kinetic condition in the system. However, this system also provides a fail-safe response to the kinetic conditions.

Since the biasing member 115 is of sufficient magnitude, valve disc 106 is always in registry with feed port 105, preventing any material flow into the air-material entrainment chamber 101, until diaphragm 111 is subjected to a differential-pressure, creating an opening force, opposing the biasing member. This action creates a fail-safe system, which reacts rapidly to any change in gas flow characteristics. Therefore, during power failure, air supply line breakage, or any other interruption to air flow, the material feed is immediately terminated.

In addition, since material feed is controlled proportionate to air flow rate, reaction to kinetic changes in the system are very rapid and independent of operating pressure. It is true that changes in conveying characteristics will result in changes in operating pressure, however, these pressure variations are much delayed by the compressible nature of pneumatics. The air flow rate, hence the pressure-differential control, are immediately indicative of conveying characteristic changes, making the modulating control mechanism instantaneous in reaction.

It can be seen, that the minimum air flow required before the modulating valve member will open, increases as the material force decreases due to reduction of material head, since both factors are used to determine the spring preload. The amount of increased flow is relatively small, however, due to the relative differences between the surface area of the diaphragm 111 and the cross-sectional area of the material inlet port 105.

In FIG. 3, the invention is shown embodied in a pressurized-feed system with a closed pressure vessel 130. The system is basically identical to the system of FIGS. 1 and 2 and like components are identified with like numerals. The pressure vessel may be either mobile or stationary.

The pressure vessel 130 has fluidizing sections 131 and slopesheets 132 therein. In its lower region, the vessel 130 is connected to the material discharge pipe 133 which terminates in the material inlet port 105 of the modulating control mechanism.

This being a closed pressure system, air or gas is supplied from a suitable source such as a blower or compressor (not shown) via branched supply line 134 to the fluidizing sections 131, thence via air supply conduit 23 to the air inlet port 102. An adjustable valve 94 is provided for interrupting air flow through the conveying system. Preferably, the valve 94 is located in the air-material discharge conduit 24, however, it could be located in conduit 23.

The same forces are effective on the system of FIG. 3 as were discussed with respect to FIGS. 1 and 2. In addition, the closed system of FIG. 3 achieves further balancing or modulating control in that it forces a predetermined differential between the pressure in the top of the tank (which functions as a reservoir) and the pressure at which air is supplied to the air-material entrainment chamber. If, upon continued unloading, the material level falls to a point which is sufficiently low so that short circuiting of pressurized air through the material dicharge pipe 133 becomes possible, any such short circuiting will immediately be reflected in the differential across the pressure-differential means 122. When this happens, the valve disc closes against the port 105 until the proper air flow past the pressure-differential means 122 is reinstated. In the meantime, further material has time to flow from the fluidizing areas to cover the discharge pipe and close the short-circuit path.

Of particular advantage is the fact that the considerable quantity of pressurized air in the vessel cannot freely vent through the discharge pipe to the conveying line when the vessel has been emptied of material. Such "air bubbles" from pressurized vessels have been known to rupture receiving equipment such as dust collectors, and are usually at least disruptive to the effectiveness of receiving equipment, very often discharging clouds of dust. With the system of FIG. 3, however, the bias of the system, to force a minimum rate of air flow past the pressure-differential means 122, causes a gradual venting of the accumulated pressure in the vessel, rather than a sudden blowdown or free venting of the air.

When the system of FIG. 3 is incorporated in a vehicle such as a railway car or truck, the pressure-differential means 122 and adjustable valve 95 may be used for adjusting the system to achieve maximum capacity for any given installation. For example, when conveying from short distances, the pressure-differential means 122 may be partially closed to magnify the differential presented to the chambers 113 and 114, thereby inducing a higher rate of material introduction to achieve the lower air-material ratio permissible with short lines. Conversely, when an extremely difficult system is to be served, the pressure-differential means 122 would then be opened as far as possible to minimize the available pressure drop, thereby forcing the higher air-material ratio necessary for long, high resistance conveying lines.

In the operation of the system of FIG. 3, the vessel 130 should first be pressurized to the desired operating pressure. This is accomplished by closing valve 94, thus closing the system to prevent air-flow and allow the pressure to build up. During pressurization, escape of material or air through the material feed port 105 is prevented by the closing force on disc 106 from the biasing member 115. The diaphragm 111 exerts no force since flow in the conduit 23 has stopped, thus eliminating the pressure-differential across the pressure-differential means 122.

After the desired amount of pressurization is achieved, valve 94 is opened. This permits free flow of the pressurized air from the vessel 130, through air supply means 23, air-material entrainment chamber 101, and air-material discharge conduit 24, to its desired destination. This established air flow creates a differential across pressure-differential means 122, with the corresponding creation of an opening force proportionate to $Fu-Fd$; permitting properly modulated material feed.

In addition, the system of the present invention permits a previously unthinkable mode of operation of a pneumatic conveying system. With the system of this invention it is possible to provide adjustable valve 94 at the discharge or "nozzle" end of the conveying line without tie-in controls leading back to the modulating control mechanism. Therefore, it is possible to completely cut off the discharge several hundred feet from the material supply vessel without a separate operator being required, and without the sole operator being required to run back to shut down valves. This is made possible by the prestressing of the system to fail-safe, upon stoppage or excessive reduction of air flow past the pressure-differential means 122.

When the "nozzle" end of the conveying line is closed off, all air flow from the vessel 130 is stopped, eliminating the pressure-differential across pressure-differential means 122, and closing the material feed port 105. Since air flow through the conveying line has been stopped, the air-material mixture entrapped therein separates, thereby allowing the material to settle to the bottom of the line.

When the nozzle at the end of the conveying line is reopened, the first effect, due to the preselected minimum flow rate, is a venting of the air in the system. As the venting increases, the settled material in the conveying line will be progressively swept out by the air without the addition of further material by the valve disc 106. Only when the rate of gas flow again reaches the predetermined minimum will the valve disc 106 again be able to lower against the force of the spring 115. However, by the time this occurs, the sweeping action of the venting air will already have cleared the accumulated or settled material in the conveying line so that the system is once again in a proper kinetic state of the introduction of material by the modulating control mechanism.

This performance can be of particular advantage in systems which deliver to multiple, alternate points in a given conveying system, since the kinetic disturbance caused by the throwing of a diverter valve cannot stall or plug the line.

A further control permitted by this system can be obtained by partial operation of valve 94. By proper sizing of the air-supply conduit and its relief valve (or unloading system) the maximum pressure on the feed tank is controlled. If valve 94 is only opened a small amount, the predetermined minimum air flow will not be obtained and material feed will not be permitted; however, some air flow will be established through the conveying system. Further opening of valve 94 causes increased air flow and a proportionate increase in pressure-differential. Therefore, by merely adjusting valve 94, one is enabled to go from pure air flow to a maximum air-material flow.

It is to be understood that a downstream adjustable valve such as valve 94 could also be used in the system of FIG. 1 with the aforementioned results.

In FIG. 4 is shown a modification of the pressure-differential means for use where it is desired to operate a system incorporating the present invention at a substantially constant pressure regardless of changes in line length, material or air supply. An automatically adjustable valve 95' is mounted in the air supply means 23. The valve 95' automatically varies the opening of the orifice 122 in response to changes in pressure in the conveying system. This is accomplished by connecting the valve gate 81 and valve stem 82 to a flexible diaphragm 83. A sealed diaphragm chamber 84 is formed by a rigid casing 85 which is covered by the flexible diaphragm 83. The valve stem 82 which is connected at its one end to the valve gate 81, extends from a housing 86 and through the rigid casing 85 and into diaphragm chamber 84. The stem is connected at its other end to the diaphragm 83. Intermediate the casing 85 and housing 86, a biasing spring 87 surrounds the valve stem 82 and engages the stem 82 through a spring seal plate 88 which is threadably connected to the valve stem 82. The biasing spring 87 is seated at its one end on the plate 88 and abuts the underside of the rigid casing 85 at its other end. The spring thus forces the valve gate 81 toward a closed position. The seat plate 88 may be raised or lowered on the stem 82 to increase or decrease the compression force in the spring. The diaphragm chamber 84 communicates with the air supply means 23 at a point upstream of the valve 95' via a conduit 89. It can be seen that any increase in pressure in the air supply means 23 will be conveyed to the diaphragm chamber 84 thus lifting the flexible diaphragm 83 which in turn raises the valve gate 81 to enlarge the orifice 122. As the orifice 122 is enlarged, the pressure-differential across the orifice is decreased. This decreased pressure differential is then communicated to the pressure diaphragm 111 in the modulating control mechanism causing the pressure diaphragm 111 to move the valve disc 106 toward the material inlet port 105. This will reduce the material feed to the entrainment chamber and hence into the conveying line thus reducing the air-material ratio, causing a decrease in the pressure in the system. Therefore, it can be seen that by so regulating the air-material ratio in the aforementioned manner, the system can be made to operate at a substantially constant pressure. The biasing spring 87 need only be set to the proper compression for the desired pressure and the operation then becomes completely automatic.

In FIG. 5 is shown a modified arrangement of the pressure-differential assembly of the present invention for use in a system subject to partial unloadings of the pressure-vessel at different points in time, such as would be true with a mobile type vessel delivering partial loads from the vessel at different destinations, or in a stationary type vessel discharging partial loads from the vessel at spaced intervals.

Under such conditions, it is desirable to shut down the compressor delivering the pressurizing and conveying air to the vessel and conveying system at intervals during the unloading of the pressure vessel. Before the compressor is shut down, means must be provided to empty the air-material conveying conduit of entrained material.

To accomplish the foregoing, a tube 92 is connected between tube 118 and 119 with a cut-off valve 93 mounted therein. During the normal operation of a pneumatic conveying system embodying the present invention, cut-off valve 93 would be in the closed position permitting the communication of pressures from ports 120 and 121, respectively, to chambers 113 and 114. The application of this differential pressure across diaphragm 111 permits material feed to the conveying system in response to air passage in conduit 23.

When valve 93 is opened the differential pressures established in ports 120 and 121 are equalized through the tube 92, preventing establishment of a differential force on diaphragm 111, thus preventing material feed to the system.

In FIG. 6 is shown a modification of the pressure-differential assembly of FIG. 3. Since the air supplied to the conveying system is supplied from the source via the pressure vessel 130, it may have entrained some of the material from the pressure vessel and, therefore, be dust laden. This dust laden air may create a problem in the system because it may accumulate in tubes 118 and 119, thus inhibiting the rapid sensing of pressure-differential to the diaphragm.

To avoid the aforementioned problem, tube 118 and tube 119 receive a negligible supply of purged air via branch lines 74 and 75, respectively, communicating with the supply line 134. Control orifices 76 and 77 as, for example, needle valves, limit the rate of flow into the tubes 118 and 119. It will be obvious to those skilled in the art that this negligible amount of purged air will prevent dust accumulation in tubes 118 and 119, while still permitting transmission of pressures from the pressure-differential means. A cut-off valve 78 may be installed in tube 119 between port 121 and the connection of purge line 75. By closing valve 78, tube 119 receives air only via purge line 75 directly from the supply line 134 and delivers it to chamber 114. Supply pressure being greater than the accumulating air pressure in the vessel and air supply means 23, the diaphragm 111 biases the valve disc 106 into its closed position regardless of the flow conditions in the conveying system.

It is to be understood that the terms "gas" and "air" have been used interchangeably throughout the specification.

Various changes may be made in the details of the invention as disclosed without departing from the spirit of the invention or the scope of the appended claims.

I claim:

1. A pneumatic conveying system including an entrainment chamber having a material inlet port, an air inlet and an air-material outlet, a material feed source communicating with said material inlet port, air supply means communicating with the entrainment chamber via the air inlet, an air-material discharge conduit communicating with the air material outlet, control force means associated with the material inlet port for rapidly and continuously controlling the direct entrainment of material in the entrainment chamber for immediate delivery of the entrained material to the air-material discharge conduit, said control force means being responsive to variations in air flow through the air supply means, and pressure differential means in the air supply means for sensing said variations in air flow, said pressure differential means communicating with the control force means for presenting a pressure differential to the control force means for effecting said material control.

2. The pneumatic conveying system of claim 1 wherein the control force means includes a modulating valve member adjacent the material inlet port, the modulating valve member being mounted for motion with respect to the material inlet port.

3. The pneumatic conveying system of claim 2 including bias means biasing the modulating valve member toward a closed position with respect to the material inlet port and said pressure differential being arranged to oppose the biasing means.

4. The pneumatic conveying system of claim 3 in which the pressure differential means includes a restricting means in the air supply means and is operable to produce a significant magnitude of pressure differential.

5. The pneumatic conveying system of claim 4 in which the restricting means is an orifice.

6. The pneumatic conveying system of claim 4 in which the restricting means is an adjustable valve.

7. The pneumatic conveying system of claim 6 in which the adjustable valve includes pressure responsive means connected therewith for automatically adjusting the valve in response to variations in pressure in the system.

8. The pneumatic conveying system of claim 4 in which the modulating valve member is mounted for reciprocation toward and away from the material inlet port.

9. The pneumatic conveying system of claim 8 in which the control force means also includes a flexible pressure diaphragm in operative engagement with the modulating valve member, and said pressure differential is communicated directly to the pressure diaphragm.

10. The pneumatic conveying system of claim 9 in which the modulating valve member comprises a valve disc with a valve stem depending therefrom, said valve stem being connected at its one end to the valve disc and engaging the biasing means at its other end.

11. The pneumatic conveying system of claim 10 in which the control force means and entrainment chamber are enclosed in a valve casing, a rigid wall member separates the entrainment chamber from a control compartment, said flexible diaphragm separates the control compartment into a first control chamber and a second control chamber said valve stem extends from the entrainment chamber through the wall member and into the said first control chamber and is connected to the flexible diaphragm, said biasing means being mounted in said second control chamber and in engagement with the second control chamber side of the diaphragm, air control inlet ports located in the walls of said first and second control chambers and conduit means connected to said inlet ports and communicating with said pressure-differential means for presenting a pressure differential to the diaphragm.

12. The pneumatic conveying system of claim 11 in which an adjusting means is connected to the biasing means for adjusting the strength of the biasing means.

13. The pneumatic conveying system of claim 12 in which the restricting means is an orifice.

14. The pneumatic conveying system of claim 12 in which the restricting means is a variable orifice.

15. The pneumatic conveying system of claim 14, in which the orifice is automatically varied by an adjustable valve mounted in the air supply means, said adjustable valve including pressure responsive means connected therewith for automatically adjusting the valve in response to variations in pressure in the system.

16. The pneumatic conveying system of claim 15 wherein said biasing means is a spring member of sufficient strength to bias said valve disc into closing engagement with said material inlet port.

17. The pneumatic conveying system of claim 16 in which a flexible sheet seal member is rigidly connected to said valve disc, said sheet seal member being sealably connected along its periphery to the walls of the entrainment chamber and forming a balance chamber adjacent said first control chamber and said balance chamber communicates with a point in the system for equalizing the pressure across the seal.

18. A pneumatic conveying system according to claim 17 in which said material feed source is a closed pressure vessel having fluidizing sections therein and said air supply means communicates with said entrainment chamber via the closed vessel.

19. A pneumatic conveying system according to claim 1 in which said material feed source is a closed pressure vessel having fluidizing sections therein and said air supply means communicates with said entrainment chamber via the closed vessel.

20. A modulating control mechanism for regulating the introduction of pulverant material into a pneumatic conveying system in response to variations in kinetic conditions within the system comprising, a valve casing forming an enclosure, a rigid wall member separating the enclosure into an air-material entrainment chamber and a control compartment, said entrainment chamber having an air supply inlet port, a material inlet port and an air-material discharge port communicating therewith, control force means associated with the material inlet port for regulating the introduction of material into the entrainment chamber in response to variations in kinetic conditions within a system, said control force means having means for communicating with a pressure-differential means.

21. The modulating control mechanism of claim 20 wherein the control force means includes a modulating valve member located in the entrainment chamber adjacent the material inlet port and mounted for motion with respect to the material inlet port.

22. A modulating control mechanism according to claim 21, wherein a biasing means is connected to the valve member for biasing said valve member toward closing engagement with said material inlet port, and wherein the valve member comprises a valve disc adjacent the material inlet port and a valve stem connects to the valve disc and extends through the rigid wall member into the control compartment, and said control force means further includes a flexible pressure diaphragm mounted in the control compartment and connected to the valve stem, and said flexible diaphragm separates the control compartment into a first control chamber and a second control chamber.

23. A modulating control mechanism according to claim 22 in which said biasing means comprises a spring member located in said second control chamber and in engagement with the flexible diaphragm, and said communication means includes air control ports located in the walls of said first and second control chambers for communication with a pressure differential means in an air supply conduit.

24. A modulating control mechanism according to claim 23 in which a flexible sheet seal member is rigidly connected to said valve disc, said sheet seal member being sealably connected along its periphery to the wall of the entrainment chamber and forming a balance chamber adjacent said first control chamber, said balance chamber communicating with the entrainment chamber to equalize the pressure across the seal.

25. A pneumatic control mechanism according to claim 24 in which an adjusting screw means is operatively connected to the spring member for varying the tension on said spring member.

26. A method of automatically controlling the air-material ratio discharging from a pneumatic conveying system comprising establishing an air flow in the pneumatic conveying system, introducing material for direct entrainment with the air flow in the system, continuously sensing variations in the air flow within the system, and rapidly and continuously controlling the direct entrainment of the material in the system in direct response to variations of the air flow into the system.

27. A method of controlling the introduction of material into a pneumatic conveying system from a fluidized vessel having a material port communicating with the conveying system comprising introducing a supply of air into the vessel, recirculating the air from said vessel to the conveying system, discharging the material from the vessel into the conveying system for direct entrainment with the air flow through the conveying system, continuously sensing variations in the air flow within the system and rapidly and continuously controlling the discharge of the material into the system for direct entrainment of the material in the system in direct response to variations of the air flow into the pneumatic conveying system.

References Cited

UNITED STATES PATENTS

| 2,404,937 | 7/1946 | Anderson | 302—35 |
| 2,439,721 | 4/1948 | Dickey | 302—35 |
| 3,275,240 | 9/1966 | Peaslee et al. | 302—42 |

ANDRES H. NIELSEN, *Primary Examiner.*